DIGITAL DETECTION AND STORAGE SYSTEM

Filed April 20, 1965 2 Sheets-Sheet 1

INVENTORS.
DENNIS J. GOODING and
ANDREW WARTELLA
BY Harry A. Herbert Jr.
George Fine
ATTORNEYS June 4, 1968 D. J. GOODING ETAL 3,387,275

DIGITAL DETECTION AND STORAGE SYSTEM

Filed April 20, 1965 2 Sheets-Sheet 2

INVENTORS.
DENNIS J. GOODING and,
ANDREW WARTELLA
BY Harry A. Herbert Jr. and
George Fine
ATTORNEYS

United States Patent Office 3,387,275
Patented June 4, 1968

3,387,275

DIGITAL DETECTION AND STORAGE SYSTEM

Dennis J. Gooding, Acton, Mass., and Andrew Wartella, Clarence, N.Y., assignors to the United States of America as represented by the Secretary of the Air Force Filed Apr. 20, 1965, Ser. No. 449,658
3 Claims. (Cl. 340—172.5)

ABSTRACT OF THE DISCLOSURE

A digital detector and storage system is provided which includes a resettable recirculating counter, a matrix connected to the output of the counter, and a gate connected to the output of the matrix. The counter is adapted to recirculate $K+\frac{1}{2}$ times if there is a change in phase of 180° in the IF input to the system from the preceding IF input. The counter recirculates exactly K times if there is no change in phase in the IF input to the system from the preceding IF input.

Figure 1:
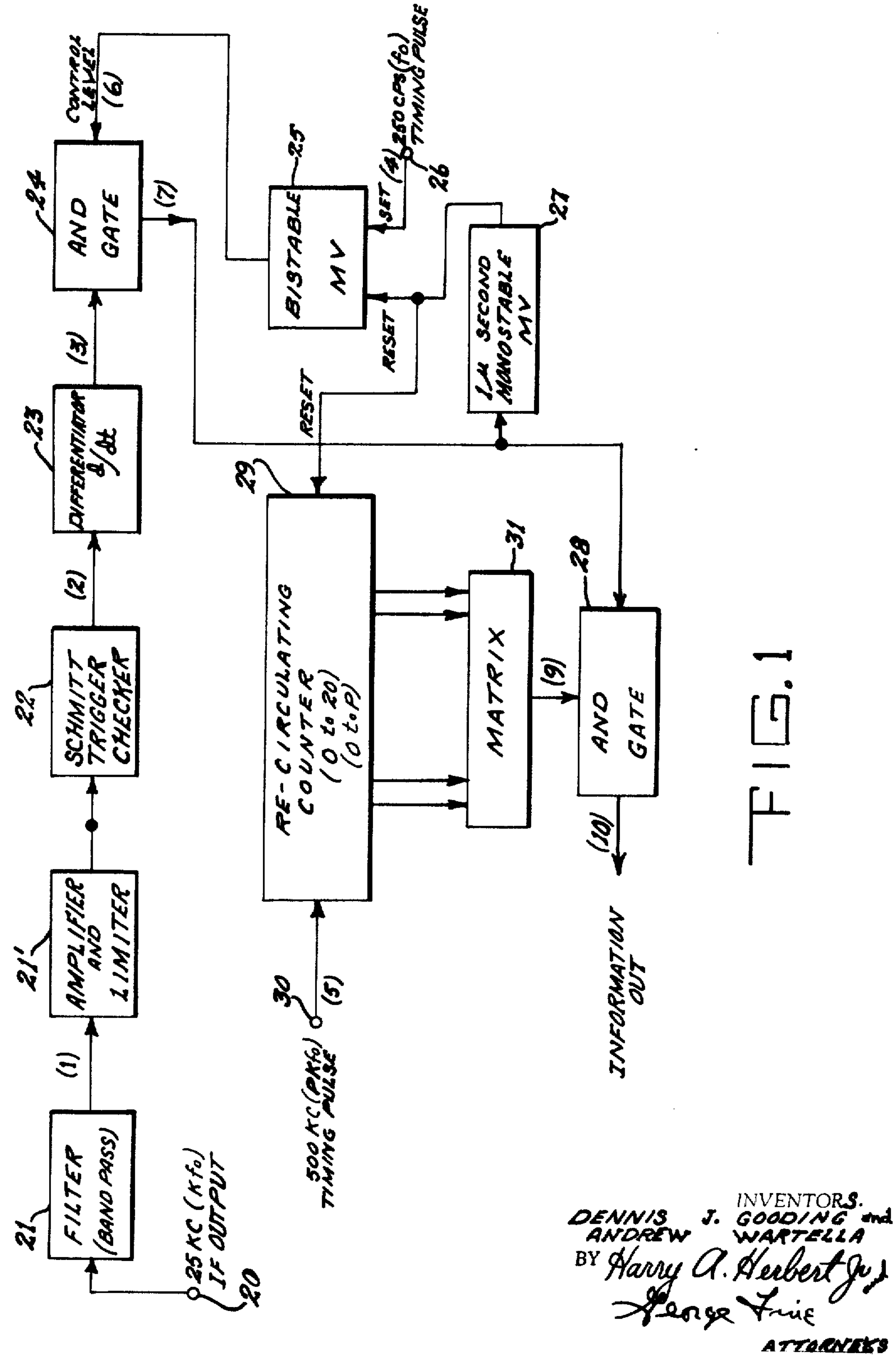

This invention relates to a digital detector and storage system and more particularly to digital detector and storage for a differentially coherent phase shift system.

The digital detector of this invention was designed to substitute for an analogue detector with the purpose of increasing reliability and reducing errors due to phase shift in the analogue storage device and DC drift in the detector circuitry.

The analogue technique utilized two bandpass filters which had a high Q. The IF was fed alternately to the two active filters in synchronism with the information bit rate; hence, each filter was allowed to build up at its driven frequency for one bit period and ring out at this frequency during the succeeding bit period. The energy in each filter was then dissipated at the end of its second bit period. The filters were driven alternately by the IF energy and an analogue phase comparison was made between the two filter outputs prior to the dissipation of the energy in one of the filters. This meant that the phase of the frequency output of one filter during "build up" was compared to the phase of the frequency output of the second filter during "ring out." Therefore, drift in the natural frequency of the filters, relative to each other, introduced a phase error which degraded system operation. Another cause of degradation to performance was due to the drift of the analogue phase comparison device itself. This device utilized a threshold which was a DC level that corresponded to a phase difference between two signals of ±90°. Any level greater than this threshold would indicate an "out of phase" condition and would produce a "mark." Consequently, any level less than the threshold would indicate an "in phase" condition and produce a "space."

The digital detection and storage technique utilizes a resettable, recirculating counter for storage and a matrix off this counter to indicate relative phase difference between information bits. This technique utilizes only one bandpass filter which may be either active or passive and a timing rate which has the stability of the local oscillator. Any long period drift error introduced in the digital system is not cumulative, but rather, being distributed over many information bits, tends to cancel itself.

The digital phase detection concept is based on the premise that the final IF is selected such that its frequency is an integral product of the information rate and the counter timing rate is an integral product of the final IF. Therefore, if the bit rate is $F_0$, the IF is $Kf_0$ and the counter timing rate is $PKf_0$, where K and P are integers.

In accordance with the present invention, there is provided a digital detector and storage system for indicating the relative phase difference between information bits. An output indicated as a "mark" shows a 180° phase change from a preceding information bit. An output indicated as a "space" shows no change in phase from a preceding information bit. The "mark" and "space" outputs are produced by a system that comprises a resettable, recirculating counter, a matrix connected to the output of the counter, and a gate connected to the output of the matrix. The counter is adapted to recirculate $K+\frac{1}{2}$ times if there is a change in phase of 180° in the IF input to the system from the preceding IF input. The counter recirculates exactly K times if there is no change in phase in the IF input to the system from the preceding IF input.

An object of the present invention is to provide a digital detector and storage for a differentially coherent phase shift system.

Another object of the present invention is to provide a digital detector and storage system for indicating the relative phase difference between information bits.

The various features of novelty which characterize this invention are pointed out with particularity in the claims annexed to and forming part of this specification. For a better understanding of the invention, however, its advantages and specific objects obtained with its use, reference should be had to the accompanying drawings and descriptive matter in which is illustrated and described a preferred embodiment of the invention.

Figure 2:
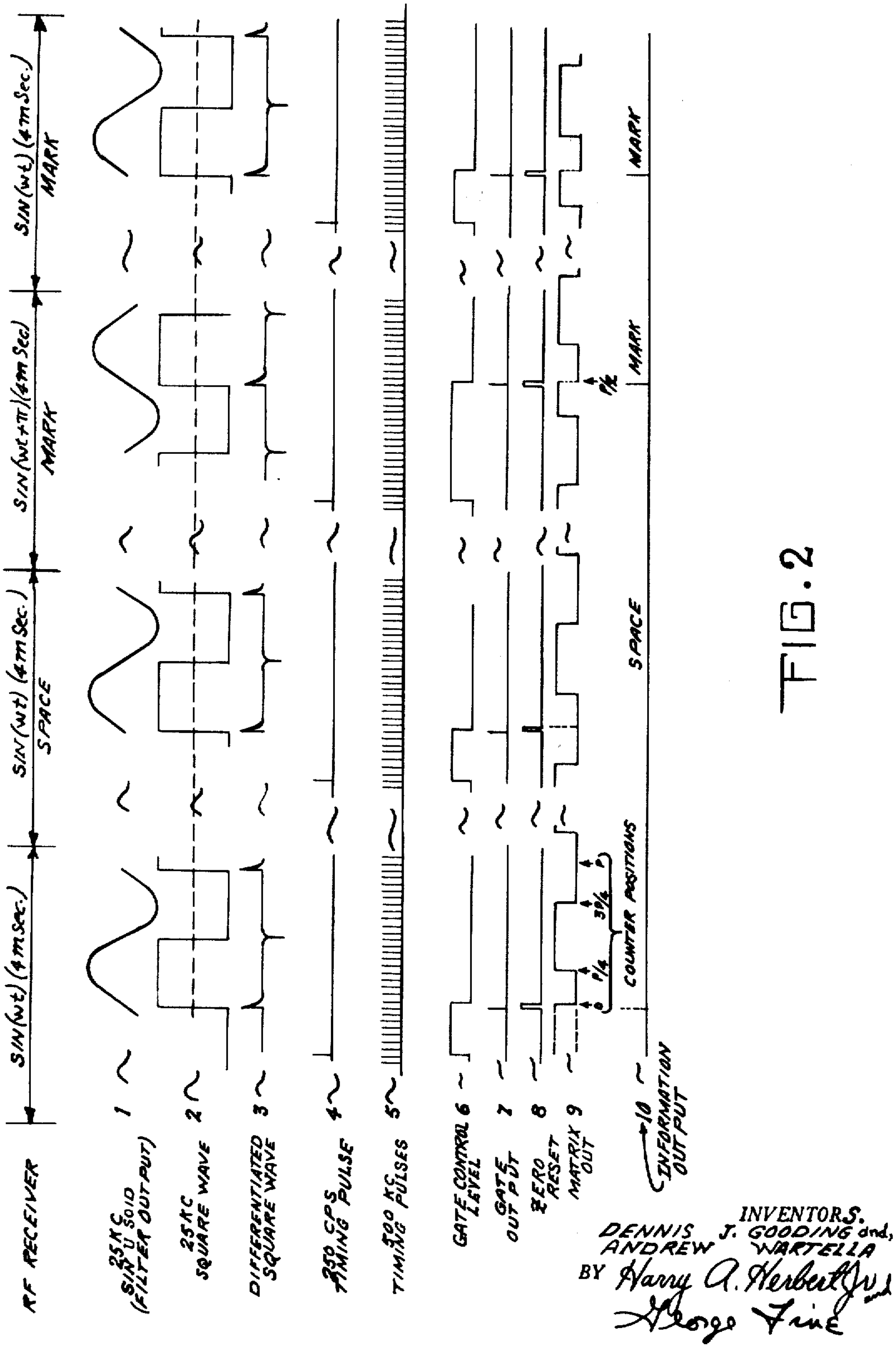

Of the drawings:

FIGURE 1 illustrates a block diagram of a preferred embodiment of the present invention; and FIGURE 2 illustrates the timing waveforms associated with FIGURE 1 and also illustrates the signal relationships.

Now referring to FIGURE 1, there is utilized for this embodiment a data rate of 250 bits/second ($F_0$), a final IF of 25 kc. ($Kf_0$) where $K=100$ and a counter timing rate of 500 kc. ($PKf_0$) where $P=20$. The counter recirculates once for each cycle of IF and the resolution is $360°/20=18°$.

The incoming IF (intermediate frequency) signal at terminal 20 is passed through single filter 21 which may be of the active or passive type. The output waveform is indicated at 1 and is illustrated as waveform 1 in FIGURE 2. Waveform 1 is then passed through amplifier and limiter 21' and then squared by Schmitt trigger circuit 22 to provide at 2 squared waveform 2 as illustrated in FIGURE 2. The squared waveform is passed through differentiator 23 to provide at 3—waveform 3 as illustrated in FIGURE 2. The positive zero crossings of the IF are now represented by positive pulses which are applied to AND gate 24.

Gate 24 is controlled by bistable multivibrator 25 which is set by timing pulses shown at 4 and illustrated as waveform 4 in FIGURE 2. The timing pulses are at an $F_0$ rate and are received at terminal 26. When set, bistable multivibrator 25 provides a positive output level shown at 6 and illustrated as waveform 6 in FIGURE 2. The aforesaid output signal of bistable multivibrator 25 opens AND gate 24 until bistable multivibrator 25 is reset. Since the information bit rate is also $F_0$, the gate is opened near the end of each information bit, and the first positive zero crossing of $Kf_0$ produces an output pulse at 7 which is illustrated as waveform 7 in FIGURE 2. The gate output pulse triggers monostable multivibrator 27 and is applied to AND gate 28 in the information output circuitry. The trailing edge of the monostable output at 8 shown as waveform 8 in FIGURE 2 is applied to reset bistable multivibrator 25, thereby returning AND gate 24 to the inhibit condition, and to reset re-circulating counter 29 to "zero."

Re-circulating counter 29 is driven by a timing pulse at 5 and illustrated as waveform 5 of FIGURE 2. This timing pulse is received at terminal 30 and has a rate of $PKf_0$ (500 kc.). Re-circulating counter 29 provides a continuously re-circulating cycle of counting to P and being reset to zero. The reset action determined by the monostable output pulse interrupts this recirculating cycle to establish a new time reference for the count cycle for the succeeding information bit; i.e., the reset pulse initiated by the positive zero crossing pulse allowed by gate 24 changes the phase of the count cycle, the frequency remaining the same. Matrix 31 is connected to the output terminals of the counter stages re-circulating counter 29 to provide a square wave output at 9 and shown as waveform 9 in FIGURE 2 to control AND gate 28; gate 28 allows the positive zero crossing pulse (allowed by gate 24) to pass and indicate a "mark" or be inhibited to indicate a "space" at 10 as shown in waveform 10 of FIGURE 2. The matrix is such that the counter positions between 0 and $P/4$ produce an "inhibit" voltage level, the counter positions between $P/4$ and $3P/4$ produce a "pass" level (positive level in waveform 9), and the counter positions between $3P/4$ and P produce an "inhibit level." Matrix 31 is a diode logic network which is operative to sense digital words to produce a "pass" voltage level when the words are in a predetermined range, i.e., $P/4$—$3P/4$, and an "inhibit" voltage level when outside this range. Circuits of this kind are well known in the digital circuitry.

With the time reference established in the recirculating counter by the preceding information bit, the control level of AND gate 24 is in the "inhibit" condition until $1/F_0$ seconds following the preceding initiation of the "pass" condition (bistable set pulse). Again the first positive zero crossing of the IF signal, after gate 24 is in the "pass" condition, produces a pulse that is passed to gate 28, which is controlled by the matrix, and produces either mark or space information.

The counter recirculates exactly K times if there is no change in phase in the IF from the preceding bit, and recirculates $K+\frac{1}{2}$ times if there is a change in phase of 180° from the preceding bit. The "no change" in phase condition is indicated by the counter position being at 0 and the matrix output level in the "inhibit" condition at the time of the monostable initiated reset. Hence, no pulse is passed by gate 28, and this indicates a "space." The 180° phase change is indicated by the counter position being at $P/2$ and the matrix output level in the "pass" condition at the time of the monostable initiated reset; hence, the first positive zero crossing pulse is passed by gate 28, and this indicates a "mark." After the output information is sampled, the trailing edge of the monostable causes the re-circulating counter to be reset to zero to establish a time reference for the following information bit, and causes gate 24 to be returned to the "inhibit" condition until $1/F_0$ seconds after the gate was initially in the pass condition. The above action is then repeated to determine the next information bit.

The counter length P determines the resolution of the phase detector and is $360°/P$. To allow for noise perturbations, the matrix recognizes the area from 0 to $P/4$ and $3P/4$ to P as a "space" and $P/4$ to $3P/4$ as a "mark." Hence an information bit phase variation of $0°\pm 90°$ is indicated as a "space" and a variation of $180°\pm 90°$ is indicated as a "mark."

A system was also constructed for a data rate of 8 bits/second ($F_0$), and IF of 10 kc. ($Kf_0$) and a counter timing rate of 1 megacycle ($PKf_0$). In this case $K=1250$, $P=100$ and the resolution was $360°/100$ which is 3.6°.

What we claim is:

1. In a digital detector and storage system for indicating relative phase difference between information bits, the information bits having a predetermined rate, comprising a single filter receiving an intermediate frequency signal including said information bits, means to amplify, limit and square said filtered signal, means to differentiate said squared signal, a first AND gate receiving said differentiated signal, a bistable multivibrator set by timing pulses also having said predetermined rate, said bistable multivibrator providing an output level to open said first AND gate until said bistable multivibrator is reset, a monostable multivibrator being triggered by a gate output pulse from said first AND gate, a resettable re-circulating counter reeciving two inputs, one of said inputs being a timing pulse having a preselected frequency and the other being said output pulse from said monostable multivibrator, and a second AND gate being interconnected to said counter by a matrix and receiving the output thereof and also receiving said output pulse from said monostable multivibrator, the trailing edge of said output pulse from said monostable multivibrator operating to reset said bistable multivibrator and also to reset said counter.

2. In a digital detector and storage system including a resettable, re-circulating counter for indicating relative phase differences between information bits with an intermediate frequency signal being selected with its frequency an integral product of the information rate and the counter timing rate being an integral product of the selected intermediate frequency signal comprising means to filter said intermediate signal, means to amplify, limit and square said filtered signal, means to differentiate said squared signal, the positive zero crossings of said intermediate frequency signal being represented by positive pulses of said differentiated signals, a bistable multivibrator receiving timing pulses for setting purposes, said timing pulses having said information rate, a first AND gate receiving two input pulses, one being said positive pulses and the other being a positive output level from said bistable multivibrator when set, said first gate being opened near the end of each information bit to provide a first gate output pulse upon the occurrence of the first of said positive pulses, a monostable multivibrator triggered by said first gate output pulse to provide a pulse to reset said counter and said bistable multivibrator, and a second AND gate being controlled by two signals, one being received from the output of said counter by way of a matrix and the second being said pulse output from said first AND gate.

3. In a digital detector and storage system including a resettable, re-circulating counter for indicating relative phase difference between information bits with an intermediate frequency signal being selected with its frequency an integral product of the information rate and the counter timing rate being an integral product of the selected intermediate frequency signal comprising means to generate a positive pulse for each positive zero crossing of said selected intermediate frequency signal, a bistable multivibrator being set by a timing pulse having a rate identical to that of said information bits, a first AND gate receiving two input signals, one being said positive pulses and the other a positive output level from said set bistable multivibrator, said first AND gate being opened near the end of each information bit, the first of said positive pulses producing a gate output pulse, a monostable multivibrator being triggered by said gate output pulse to provide a signal to reset said counter and said bistable multivibrator, and a second AND gate receiving two input signals one being from said counter by way of a matrix and the second being said output pulse from said first AND gate.

References Cited

UNITED STATES PATENTS

| | | | |
|---|---|---|---|
| 3,337,723 | 8/1967 | Etnyre | 235—150.27 |
| 3,271,742 | 9/1966 | Rumble et al. | 340—167 |
| 3,257,508 | 6/1966 | Crafts et al. | 178—67 |
| 3,185,978 | 5/1965 | Edson | 340—350 |
| 3,168,725 | 2/1965 | Neer | 340—172.5 |
| 3,072,893 | 1/1963 | Fuller | 340—174.1 |
| 2,901,166 | 8/1959 | Hamilton et al. | 235—61 |

ROBERT C. BAILEY, *Primary Examiner.*

GARETH D. SHAW, *Examiner.*